United States Patent [19]
Kobayashi et al.

[11] Patent Number: 5,880,227
[45] Date of Patent: Mar. 9, 1999

[54] CURABLE OIL-AND WATER-REPELLENT SILICONE COMPOSITION

[75] Inventors: Hideki Kobayashi; Toru Masatomi, both of Chiba Prefecture, Japan

[73] Assignee: Dow Corning Toray Silicone Co., Ltd., Tokyo, Japan

[21] Appl. No.: 684,895

[22] Filed: Jul. 25, 1996

[30] Foreign Application Priority Data

Jul. 31, 1995 [JP] Japan .................................... 7-214156

[51] Int. Cl.$^6$ .................................................. C08G 77/24
[52] U.S. Cl. .............................. 525/477; 528/14; 528/15; 528/17; 528/18; 528/19; 528/34; 528/36; 525/102
[58] Field of Search .................................. 528/34, 17, 15, 528/14, 18, 19, 36; 525/102, 477

[56] References Cited

U.S. PATENT DOCUMENTS 5,371,155 12/1994 Kobayashi .............................. 525/477

FOREIGN PATENT DOCUMENTS

| 51-148749 | 12/1976 | Japan . |
|---|---|---|
| 05059285 | 3/1993 | Japan . |
| 2067212 | 7/1981 | United Kingdom . |

*Primary Examiner*—Samuel A. Acquah
*Attorney, Agent, or Firm*—Arne R. Jarnholm

[57] ABSTRACT

A moisture-curable silicone composition is prepared from (A) an organopolysiloxane resin having hydrolyzable groups associated therewith, (B) a fluorosilicone resin having residual silanol groups associated therewith, (C) a hydrolyzable organosilane and (D) a cure accelerating catalyst. The cured composition of the invention in prepared by reacting the aforementioned components (A) through (D) in the presence of moisture and results in a material exhibiting superior oil- and water-repellent properties.

9 Claims, No Drawings

CURABLE OIL-AND WATER-REPELLENT SILICONE COMPOSITION

BACKGROUND OF THE INVENTION

1. Field of the Invention

The present invention relates generally to curable silicone compositions and more particularly to a curable silicone composition that forms a highly water-repellent and highly oil-repellent cured coating.

2. Description of the Prior Art

Japanese Patent Application Laid Open [Kokai or Unexamined] Number Sho 51-148749 [148,749/1976] teaches an example of a silicone composition that cures at room temperature to form a coating. The composition taught therein comprises organopolysiloxane resin and two types of alkoxysilanes. With respect to silicone compositions that form water-repellent cured films, Japanese Patent Application Laid Open [Kokai or Unexamined] Number Sho 55-48245 [48,245/19801 teaches a composition comprising organopolysiloxane resin, alpha,omega-dihydroxydiorganosiloxane, and organosilane, while Japanese Patent Application Laid Open [Kokai or Unexamined] Number Hei 5-59285 [59,285/1993] discloses a composition comprising organopolysiloxane resin, alpha,omega-dihydroxyfluoroalkylmethylpolysiloxane, and organosilane.

The afore-mentioned compositions, however, do not yield cured films with fully satisfactory levels of water repellency and oil repellency, and as a result these compositions cannot be used in applications where higher levels of water- and oil-repellency performance are required.

SUMMARY OF THE INVENTION

It is therefore an object of the present invention to provide a curable silicone composition that cures at room temperature in the presence of moisture and which affords a highly water-repellent and highly oil-repellent coating.

In accordance with the present invention, there is provided a curable silicone composition that comprises:

(A) 100 weight parts organopolysiloxane resin with the average unit formula $$R_a(OZ)_b SiO_{(4-a-b)/2}$$

wherein R denotes substituted or unsubstituted monovalent hydrocarbon groups, Z is the hydrogen atom or a C1 to C6 alkyl group, a is from 0.80 to 1.80, and b is a value that affords a content of silicon-bonded hydroxyl or alkoxy group in this compound of from 0.01 to 10 weight %;

(B) 0.5 to 500 weight parts a fluorosilicone resin selected from the group of fluorosilicone resins having the average unit formulae $$\{F(CF_2)_c-R^1-SiO_{3/2}\}_m(R_dSiO_{(4-d)/2})_n$$

$$\{F(CF_2)_c-R^1-SiO_{3/2}\}_m(SiO_{4/2})_n$$

$$\{F(CF_2)_c-R^1-SiO_{3/2}\}_m \text{ and}$$

$$\{F(CF_2)_c-R^1-SiO_{3/2}\}_f(R_3SiO_{1/2})_g(SiO_{4/2})_h$$

wherein R denotes substituted and unsubstituted monovalent hydrocarbon groups, $R^1$ is an alkylene or alkyleneoxyalkylene group, c is an integer with a value of at least 4, d is an integer with a value from 1 to 3, m is a number greater than 0, and n is a number greater than 0; f, g, and h are each numbers greater than 0 and $(g+h) \geq f$.

(C) 1 to 90 weight parts of an organosilane selected from the group consisting of organosilanes having the general formulae $$R_e SiY_{4-e} \text{ and}$$

$$SiY_4$$

wherein R denotes substituted and unsubstituted monovalent hydrocarbon groups, Y is a hydrolyzable group, and e is an integer with a value of 1 or 2, or the partial hydrolysis condensate thereof; and (D) a cure-accelerating catalyst in sufficient quantity to cure the composition.

The organopolysiloxane resin constituting component (A) is defined by the average unit formula given above. The R in this formula represents substituted and unsubstituted monovalent hydrocarbon groups and is exemplified by alkyl groups such as methyl, ethyl, propyl, tert-butyl, 2-ethylhexyl, dodecyl and octadecyl; alkenyl groups such as vinyl and allyl; aryl groups such as phenyl and naphthyl; and substituted alkyl groups such as chloromethyl, 3,3,3-trifluoropropyl, 3,3,4,4,5,5,5-heptafluoropentyl and difluoromonochloropropyl. Alkyl and alkenyl are preferred among the preceding, and methyl is particularly preferred. Z is the hydrogen atom or a C1 to C6 alkyl group, for example, methyl, ethyl, propyl, or butyl. The group represented by OZ is therefore either the hydroxyl group or an alkoxy group. The subscript a has a value from 0.80 to 1.80. The subscript b has a value that gives a content of silicon-bonded hydroxyl or alkoxy in this compound of 0.01 to 10 weight % and preferably gives a value of 0.05 to 5 weight %.

Organopolysiloxane resin (A) can be prepared, for example, by subjecting a mixture of organochlorosilanes, having on average 0.80 to 1.80 monovalent hydrocarbon groups per silicon atom, to hydrolysis in the presence of organic solvent followed by condensation. Submitting the organopolysiloxane resin thus prepared to heat treatment will yield organopolysiloxane resin in which a portion of the silanol has been condensed. The organochlorosilane mixture is exemplified by mixtures of methyltrichlorosilane and dimethyldichlorosilane, optionally with the addition of trimethylchlorosilane or tetrachlorosilane. A portion of the chlorosilane may be replaced with alkoxysilane.

The fluorosilicone resin (B) defined by the preceding average unit formulae is the component that characterizes the present invention. R in the preceding formulae represents substituted and unsubstituted monovalent hydrocarbon groups, which are exemplified by the same groups as elaborated above. Alkyl and alkenyl are again preferred, and methyl is also particularly preferred in the present case. $R^1$ is an alkylene or alkyleneoxyalkylene group, wherein the alkylene groups are exemplified by ethylene, methylethylene, ethylethylene, propylethylene, butylethylene, propylene, butylene, 1-methylpropylene, pentylene, hexylene, heptylene, octylene, nonylene, and decylene, and the alkyleneoxyalkylene groups are exemplified by ethyleneoxyethylene, ethyleneoxypropylene, ethyleneoxybutylene, propyleneoxyethylene, propyleneoxypropylene, propyleneoxybutylene, butyleneoxyethylene, and butyleneoxypropylene. The subscript c is an integer with a value of at least 4 and preferably with a value from 4 to 12, and it is exemplified by 4, 6, and 8. The subscript d is an integer from 1 to 3, m is a number with a value greater than 0, and n is a number with a value greater than 0.

The fluorosilicone resin (B) can be prepared, for example, by running a condensation reaction in organic solvent in the presence of a condensation-accelerating catalyst between fluoroalkylsilane with the general formula $F(CF_2)_c$—$R^1$—$SiX_3$ ($R^1$ and c are defined as above and x is a halogen atom such as chlorine or bromine or an alkoxy group such as methoxy, ethoxy, propoxy, butoxy, and so forth) and the known organopolysiloxane resin comprising the $R_3SiO_{1/2}$ and $SiO_{4/2}$ siloxane units (R is defined as above). Organic solvents useable for this purpose are exemplified by aromatic solvents such as toluene, xylene, and by fluorinated solvents such as alpha,alpha,alpha-trifluorotoluene and hexafluoroxylene. The subject fluorosilicone resin can also be prepared by subjecting the fluoroalkylsilane $F(CF_2)_c$—$R^1$—$SiX_3$ ($R^1$, c, and X are defined as above) and optionally organosilane with the general formula $R_dSiX_{4-d}$ (R, X, and d are defined as above) to (co)hydrolysis in the presence of organic solvent and acidic aqueous solution followed by condensation. This particular method can be carried out, for example, by dissolving the silane with the general formula or formulas given above in organic solvent and adding this solution dropwise to a stirred acidic aqueous solution or by adding the acidic aqueous solution dropwise to the stirred organic solvent solution. Organic solvents useable for this purpose preferably are capable of dissolving both the silane precursor and the fluorosilicone resin product, and are exemplified by ethers such as diethyl ether and tetrahydrofuran; ketones such as acetone and methyl isobutyl ketone; fluorinated solvents such as alpha,alpha,alpha-trifluorotoluene and hexafluoroxylene; and by volatile silicone solvents such as hexamethyldisiloxane, hexamethylcyclotrisiloxane, and octamethylcyclotetrasiloxane.

The silane concentration in the organic solvent is preferably selected so as to generally give a concentration of 10 to 80 weight % for the fluorosilicone resin product. Aqueous solutions of sulfuric acid, nitric acid, hydrochloric acid and other strong protic acids, may be used as the acidic aqueous solution. The use of aqueous hydrochloric acid is preferred, in which case a hydrogen chloride concentration of at least 5 weight % is preferred. The temperature during and after dropwise addition is preferably in the range from 0° C. to 120° C.

After the optional addition of organic solvent or water, the resulting fluorosilicone resin solution is then allowed to stand in order to obtain separation of the aqueous layer. The organic solvent layer containing the fluorosilicone resin is, at this point, preferably washed with water to neutrality. The organic solvent layer is then preferably dried after the water wash step, wherein this drying preferably employs an azeotrope with organic solvent and a water-separation tube. The organic solvent used for this purpose should have a low solubility in water. The resulting fluorosilicone resin (B) will contain some residual silanol, and its silanol content will generally be in the range from 0.01 to 10 weight % and preferably is in the range from 0.05 to 5 weight %.

Component (B) is added at 0.5 to 500 weight parts and preferably at 0.5 to 100 weight parts, in each case per 100 weight parts component (A). The use of less than 0.5 weight part results in a cured coating with an inadequate water- and oil-repellency, while the use of more 500 weight parts causes the cured film to be soft and thus to have an inadequate durability.

The fluorosilicone resin (B) is exemplified by compounds with the following average unit formulae:

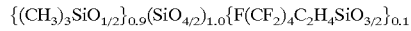

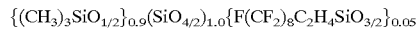

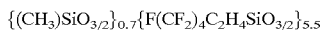

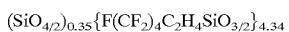

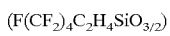

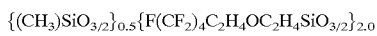

Component (C), which is an organosilane with one of the general formulae given above or the partial hydrolysis condensate thereof, functions to induce the cure of the composition according to the present invention at room temperature in the presence of moisture. R in the formula given above represents substituted and unsubstituted mionovalent hydrocarbon groups, which are exemplified by the same groups as elaborated above. Y is a hydrolyzable group and is exemplified by diorganoketoxime groups such as dim ethyl ketoxime and methyl ethyl ketoxime; alkoxy groups such as methoxy and ethoxy; acyloxy groups such as acetoxy; organoamino groups such as N-butylamino; organoacylamide groups such as methylacetamide; N,N-diorganohydroxyamino groups such as N,N-diethylhydroxyamino; and by alkenyloxy groups such as propenoxy. The subscript e is an integer with a value of 1 or 2 and preferably has a value of 1. Component (C) may consist of only a single organosilane or partial hydrolysis condensate thereof or may consist of a mixture of two or more different organosilanes or partial hydrolysis condensates thereof. Component (C) is added at from 1 to 90 weight parts and preferably at from 1 to 60 weight parts, in each case per 100 weight parts component (A).

The cure-accelerating catalyst (D) is employed to accelerate the cure of the composition according to the present invention. The condensation reaction-accelerating catalysts used for the dehydration condensation of silanol groups are generally effective as this catalyst. Specific examples here are the tin salts of carboxylic acids such as dibutyltin diacetate, dibutyltin dilaurate, dibutyltin dioctoate, stannous octoate, stannous naphthenate, stannous oleate, stannous isobutyrate, stannous linoleate, stannous stearate, stannous benzoate, stannous naphthoate, stannous laurate, stannous o-thymotate, stannous beta-benzoylpropionate, stannous crotonate, stannous tropate, stannous p-bromobenzoate, stannous palmitoleate, stannous cinnamate and stannous phenylacetate; the iron salts, manganese salts, and cobalt salts of the preceding carboxylic acids; as well as the tetraalkyl titanates, complex salts of dialkyl titanates and organosiloxytitanates.

Component (D) is added in sufficient quantity to induce the cure of the composition according to the present invention, and will generally be added in the range from 0.0001 to 10 weight parts per 100 weight parts component (A).

The composition according to the present invention comprises the components (A) through (D) described above, but it may also contain silane coupling agents (as exemplified below) for the purpose of improving the adherence to a range of substrates.

$NH_2CH_2CH_2Si(OC_2H_5)_3$ $NH_2CH_2CH_2NH(CH_2)_3Si(OCH_3)_3$

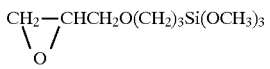

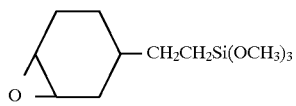

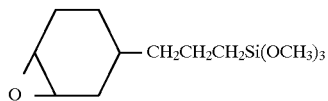

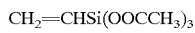

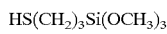

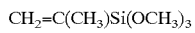

The silane coupling agent may be used in the form of a single silane coupling agent or a mixture of two or more different silane coupling agents. The silane coupling agent is preferably added at from 0.01 to 10 weight % referred to the composition according to the present invention.

The composition according to the present invention can be prepared by mixing the above-described components (A) to (D) to homogeneity, in the absence of moisture. The mixing sequence here is not critical, but when the organopolysiloxane resin (A) is a solid it is preferably first dissolved in organic solvent and the resulting solution is then mixed with the other components. Organic solvents useful for this purpose are exemplified by aromatic solvents such as benzene, toluene and xylene; aliphatic solvents such as cyclohexane, methylcyclohexane and dimethylcyclohexane; chlorinated solvents such as trichloroethylene, 1,1,1-trichloroethane, carbon tetrachloride and chloroform; saturated aliphatic hydrocarbon solvents such as hexane and industrial gasoline; ethers such as diethyl ether and tetrahydrofuran; ketone solvents such as methyl isobutyl ketone; fluorinated solvents such as alpha,alpha,alpha-trifluorotoluene, hexafluoroxylene, and so forth; and volatile silicones such as hexamethyldisiloxane, hexamethylcyclotrisiloxane and octamethylcyclotetrasiloxane.

The composition according to the present invention is preferably used diluted with organic solvent, and organic solvents useable for this purpose are exemplified by the same solvents as used for dissolution of the organopolysiloxane resin (A). When an organic solvent is used, it is preferably used in an amount that gives a value of 5 to 90 weight % for the composition according to the present invention.

The composition according to the present invention as described above can be stored in the absence of moisture for long periods of time. It cures at room temperature in the presence of moisture to form a coating with an excellent water repellency, oil repellency, resistance to fouling and staining, heat resistance, weathering resistance, and chemical resistance. Curing can be accelerated by heating. The composition according to the present invention is therefore highly useful in a variety of applications where the aforementioned properties are required, for example, as an agent for preventing the adhesion of water drops, snow, and ice, as an antifouling or antistaining coating, and as a release coating, including mold-release applications.

EXAMPLES

The invention will be explained in greater detail below through working examples. The water repellency of the cured coatings was evaluated through the contact angle with water and the water sliding angle. The oil repellency was evaluated through the contact angle with n-hexadecane. The contact angles were measured as follows: using a microsyringe, water or hexadecane was dripped at 20° C. onto the cured coating at 10 locations; the corresponding contact angles were measured using a contact angle meter from Kyowa Kaimen Kagaku Kabushiki Kaisha; and these values were averaged to give the contact angle for the cured coating. The water sliding angle was measured as follows: water was dripped as above onto the cured coating at 5 locations; the corresponding sliding angles of these water drops were measured using a drop sliding angle meter from Erma Inc.; and these values were averaged to give the sliding angle of the cured coating.

Synthesis Example 1

67.1 g methylpolysiloxane resin (silanol content=2 weight %) composed of the $(CH_3)_3SiO_{1/2}$ and $SiO_{4/2}$ siloxane units in a 0.9:1.0 molar ratio, 200 g xylene hexafluoride, 19.3 g nonafluorohexyltrimethoxysilane $F(CF_2)_4C_2H_4Si(OCH_3)_3$, and 1 g dibutyltin dilaurate were placed in a flask equipped with a stirrer, thermometer, and condenser. Reaction at 100° C. for 9 hours afforded a homogeneous and transparent solution. Analysis of this transparent solution by gas chromatography demonstrated complete disappearance of the nonafluorohexyltrimethoxysilane peak. The volatiles were thereafter eliminated by heating the transparent solution under reduced pressure. Analysis of the resulting reaction product by infrared absorption spectroscopy and nuclear magnetic resonance spectroscopy confirmed it to be fluorosilicone resin with the following average unit formula.

$$\{(CH_3)_3SiO_{1/2}\}_{0.9}(SiO_{4/2})_{1.0}\{F(CF_2)_4C_2H_4SiO_{3/2}\}_{0.1}$$

Synthesis Example 2

67.1 g methylpolysiloxane resin (silanol content=2 weight %) composed of the $(CH_3)_3SiO_{1/2}$ and $SiO_{4/2}$ siloxane units in a 0.9:1.0 molar ratio, 200 g xylene hexafluoride, 8.4 g heptadecafluorodecyltriethoxysilane $F(CF_2)_8C_2H_4Si(OC_2H_5)_3$, and 1 g dibutyltin dilaurate were placed in a flask equipped with a stirrer, thermometer, and condenser. Reaction at 100° C. for 9 hours afforded a homogeneous and transparent solution. Analysis of this transparent solution by gas chromatography demonstrated complete disappearance of the heptadecafluorodecyltriethoxysilane peak. The volatiles were thereafter eliminated by heating the transparent solution under reduced pressure. Analysis of the resulting reaction product by infrared absorption spectroscopy and nuclear magnetic resonance spectroscopy confirmed it to be fluorosilicone resin with the following average unit formula, $$\{(CH_3)_3SiO_{1/2}\}_{0.9}(SiO_{4/2})_{1.0}\{F(CF_2)_8C_2H_4SiO_{3/2}\}_{0.05}$$

Synthesis Example 3

6 g 2-propanol, 30 g xylene hexafluoride, and 8 g water were introduced into a flask equipped with a stirrer, thermometer, and condenser. A mixture of 20 g xylene hexafluoride and 57.2 g nonafluorohexyltrichlorosilane was then added dropwise while stirring. Mixing was continued for an additional 2 hours after the completion of addition. The reaction solution was subsequently held at quiescence in order to separate the organic solvent layer, which was then washed repeatedly with water. Gas chromatographic analysis of the water-washed organic solvent layer confirmed the complete disappearance of the nonafluorohexyltrichlorosilane peak. The volatiles were then eliminated by heating the organic solvent layer under reduced pressure. Analysis of the resulting reaction product by infrared absorption spectroscopy and nuclear magnetic resonance spectroscopy confirmed it to be fluorosilicone resin (degree of polymerization=approximately 7) with the following average unit formula.

$$\{F(CF_2)_4C_2H_4SiO_{3/2}\}$$

Example 1

10 g methylpolysiloxane resin (silanol content=0.9 weight %) composed of 80 mole % siloxane unit with the formula $(CH_3)SiO_{3/2}$ and 20 mole % siloxane unit with the formula $(CH_3)_2SiO_{2/2}$ was dissolved in 10 g toluene and 70 g xylene hexafluoride. A curable silicone composition was prepared by the addition to the preceding with mixing to homogeneity of 1 g of the fluorosilicone resin whose synthesis is described in Synthesis Example 1, 7.3 g methyltri(methyl ethyl ketoxime)silane, and 1 g dibutyltin diacetate. The resulting silicone composition was coated onto a smooth, flat glass plate using a spin coater, and a cured coating was formed by then holding for 1 week at room temperature. The contact angles of this cured coating were measured with the following results: 105° versus water and 58° versus n-hexadecane. The sliding angle for water was 21°.

Comparative Example 1

A curable silicone composition was prepared as in Example 1, but in this case without the addition of the fluorosilicone resin of Synthesis Example 1 that was added in Example 1. The resulting silicone composition was also cured as directed in Example 1, and the contact angles of this coating were measured with the following results: 104° versus water and 34° versus n-hexadecane. The sliding angle for water was 36°, These results confirmed that the cured coating prepared in Example 1 exhibited better water and oil repellencies.

Example 2

10 g methylpolysiloxane resin (silanol content=0.9 weight %) composed of 80 mole % siloxane unit with the formula $(CH_3)SiO_{3/2}$ and 20 mole % siloxane unit with the formula $(CH_3)_2SiO_{2/2}$ was dissolved in 10 g toluene and 70 g xylene hexafluoride. A curable silicone composition was prepared by the addition to the preceding with mixing to homogeneity of 1.5 g of the fluorosilicone resin whose synthesis is described in Synthesis Example 2, 7.3 g methyltri(methyl ethyl ketoxime)silane, and 1 g dibutyltin diacetate. The resulting silicone composition was coated onto a smooth, flat glass plate using a spin coater, and a cured coating was formed by then holding for 1 week at room temperature- The contact angles of this cured coating were measured with the following results: 110° versus water-and 63° versus n-hexadecane. The sliding angle for water was 22°.

Example 3

10 g methylpolysiloxane resin (silanol content=1.5 weight %) composed of 90 mole % siloxane unit with the formula $(CH_3)SiO_{3/2}$ and 10 mole % siloxane unit with the formula $(CH_3)_2SiO_{2/2}$ was dissolved in 10 g toluene and 70 g xylene hexafluoride. A curable silicone composition was prepared by the addition to the preceding with mixing to homogeneity of 1 g of the fluorosilicone resin whose synthesis is described in Synthesis Example 2, 7.3 g methyltrimethoxysilane, 1 g 3-(2-aminoethyl)aminopropyltrimethoxysilane, and 1 g dibutyltin dilaurate. The resulting silicone composition was coated onto a smooth, flat glass plate using a spin coater, and a cured coating was formed by then holding for 1 week at room temperature. The contact angles of this cured coating were measured with the following results: 107° versus water and 59° versus n-hexadecane. The sliding angle for water was 23°.

Example 4

10 g methylpolysiloxane resin (silanol content=1.0 weight %) composed of 85 mole % siloxane unit with the formula $(CH_3)SiO_{3/2}$ and 15 mole % siloxane unit with the formula $(CH_3)_2SiO_{2/2}$ was dissolved in 10 g toluene and 20 g xylene hexafluoride. A curable silicone composition was prepared by the 10 addition to the preceding with mixing to homogeneity of 0.5 g of the fluorosilicone resin whose synthesis is described in Synthesis Example 3, 7.3 g methyltrimethoxysilane, 1 g 3-(2-aminoethyl)aminopropyltrimethoxysilane, and 1 g dibutyltin dilaurate. The resulting silicone composition was coated onto a smooth, flat glass plate using a spin coater, and a cured coating was formed by then holding for 1 week at room temperature. The contact angles of this cured coating were measured with the following results: 109° versus water and 66° versus n-hexadecane.

Because the curable silicone composition according to the present invention comprises the components (A) to (D) as described above, and in particular because it contains the organopolysiloxane resin (A) and fluorosilicone resin (B), the composition is characterized by the ability to cure at room temperature in the presence of moisture to yield a highly water-repellent and highly oil-repellent coating.

Although various embodiments of the composition of the present invention, and particular features and advantages thereof have been illustrated by way of example, those skilled in the art will understand that the scope of the present invention is not limited thereby and should be judged solely in accordance with the following claims and equivalents thereof.

What is claimed is:

1. A moisture-curable silicone composition comprising:
   (A) 100 weight parts organopolysiloxane resin with the average unit formula $$R_a(OZ)_bSiO_{(4-a-b)/2}$$

wherein R denotes substituted or unsubstituted monovalent hydrocarbon groups, Z is the hydrogen atom or a C1 to C6 alkyl group, a is from 0.80 to 1.80, and b is a value that affords a content of silicon-bonded hydroxyl or alkoxy group in this compound of from 0.01 to 10 weight %;
   (B) 0.5 to 500 weight parts a fluorosilicone resin selected from the group of fluorosilicone resins having the average unit formulae $$\{F(CF_2)_c-R^1-SiO_{3/2}\}_m(R_dSiO_{(4-d)/2})_n,$$

$$\{F(CF_2)_c-R^1-SiO_{3/2}\}_m(SiO_{4/2})_n,$$

$$\{F(CF_2)_c-R^1-SiO_{3/2}\}_m, \text{ and}$$

$$\{F(CF_2)_c-R^1-SiO_{3/2}\}_f(R_3SiO_{1/2})_g(SiO_{4/2})_h$$

wherein R denotes substituted and unsubstituted monovalent hydrocarbon groups, $R^1$ is an alkylene or alkyleneoxyalkylene group, c is an integer with a value of at least 4, d is an integer with a value from 1 to 3, m is a number greater than 0, and n is a number greater than 0; f, g, and h are each numbers greater than 0 and (g+h)≧f.

(C) 1 to 90 weight parts of an organosilane selected from the group consisting of organosilanes having the general formulae $R_eSiY_{4-e}$ and $SiY_4$, wherein R denotes substituted and unsubstituted monovalent hydrocarbon groups, Y is a hydrolyzable group, and e is an integer with a value of 1 or 2, and the partial hydrolysis condensate of the organosilane; and (D) a cure-accelerating catalyst in sufficient quantity to cure the composition.

2. A composition in accordance with claim 1 wherein R is a substituted or unsubstituted hydrocarbon group selected from the group consisting of methyl, ethyl, propyl, tert-butyl, 2-ethylhexyl, dodecyl, octadecyl, vinyl, allyl, phenyl, naphthyl, chloromethyl, 3,3,3-trifluoropropyl, 3,3,4,4,5,5,5-heptafluoropentyl and difluoromonochloropropyl.

3. A composition in accordance with claim 1 wherein $R^1$ is an alkylene or alkyleneoxyalkylene group selected from the group consisting of ethylene, methylethylene, ethylethylene, propylethylene, butylethylene, propylene, butylene, 1-methylpropylene, pentylene, hexylene, heptylene, octylene, nonylene, decylene, ethyleneoxyethylene, ethyleneoxypropylene, ethyleneoxybutylene, propyleneoxyethylene, propyleneoxypropylene, propyleneoxybutylene, butyleneoxyethylene, and butyleneoxypropylene.

4. A composition in accordance with claim 1 wherein Y is a hydrolyzable group selected from the group consisting of dimethyl ketoxime, methyl ethyl ketoxime, methoxy, ethoxy, acetoxy, N-butylamino, methylacetamide, N,N-diethylhydroxyamino and propenoxy.

5. A composition in accordance with claim 1 wherein said cure accelerating catalyst (D) is selected from the group consisting of dibutyltin diacetate, dibutyltin dilaurate, dibutyltin dioctoate, stannous octoate, stannous naphthenate, stannous oleate, stannous isobutyrate, stannous linoleate, stannous stearate, stannous benzoate, stannous naphthoate, stannous laurate, stannous o-thymotate, stannous beta-benzoylpropionate, stannous crotonate, stannous tropate, stannous p-bromobenzoate, stannous palmitoleate, stannous cinnamate, stannous phenylacetate, iron salts, manganese salts, and cobalt salts of the preceding carboxylic acids, tetraalkyl titanates, complex salts of dialkyl titanates and organosiloxytitanates.

6. A composition in accordance with claim 1 wherein said fluorosilicone resin (B) is selected from the group consisting of $\{(CH_3)_3SiO_{1/2}\}_{0.9}(SiO_{4/2})_{1.0}\{F(CF_2)_4C_2H_4SiO_{3/2}\}_{0.1}$, $\{(CH_3)_3SiO_{1/2}\}_{0.9}(SiO_{4/2})_{1.0}\{F(CF_2)_8C_2H_4SiO_{3/2}\}_{0.05}$, $\{(CH_3)_2SiO_{2/2}\}_{1.8}\{F(CF_2)_4C_2H_4SiO_{3/2}\}_{12.2}$, $\{(CH_3)SiO_{3/2}\}_{0.7}\{F(CF_2)_4C_2H_4SiO_{3/2}\}_{5.5}$, $(SiO_{4/2})_{0.35}\{F(CF_2)_4C_2H_4SiO_{3/2}\}_{4.34}$, $(F(CF_2)_4C_2H_4SiO_{3/2})$ and $\{(CH_3)SiO_{3/2}\}_{0.5}\{F(CF_2)_4C_2H_4OC_2H_4SiO_{3/2}\}_{2.0}$.

7. A composition in accordance with claim 1 further comprising (E) a silane coupling agent.

8. A composition in accordance with claim 7 wherein said silane coupling agent is selected from the group consisting of $NH_2CH_2CH_2Si(OC_2H_5)_3$, $NH_2CH_2CH_2NH(CH_2)_3Si(OCH_3)_3$,

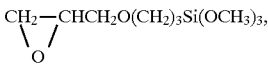

$CH_2=CHSi(OCH_3)_3$,
$CH_2=CHSi(OC_2H_5)_3$,

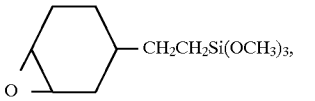

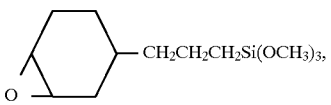

$CH_2=CHSi(OOCCH_3)_3$,
$HS(CH_2)_3Si(OCH_3)_3$,
$CH_2=C(CH_3)Si(OCH_3)_3$ and combinations thereof.

9. A cured silicone composition prepared by reacting the following components in the presence of atmospheric moisture, said components comprising:

(A) 100 weight parts organopolysiloxane resin with the average unit formula $$R_a(OZ)_b SiO_{(4-a-b)/2}$$

wherein R denotes substituted or unsubstituted monovalent hydrocarbon groups, Z is the hydrogen atom or a C1 to C6 alkyl group, a is from 0.80 to 1.80, and b is a value that affords a content of silicon-bonded hydroxyl or alkoxy group in this compound of from 0.01 to 10 weight %;

(B) 0.5 to 500 weight parts a fluorosilicone resin selected from the group of fluorosilicone resins having the average unit formulae $\{F(CF_2)_c-R^1-SiO_{3/2}\}_m(R_dSiO_{(4-d)/2})_n$, $\{F(CF_2)_c-R^1-SiO_{3/2}\}_m(SiO_{4/2})_n$, $\{F(CF_2)_c-R^1-SiO_{3/2}\}_m$, and $\{F(CF_2)_c-R^1-SiO_{3/2}\}_f R_3SiO_{1/2})_g(SiO_{4/2})_h$ wherein R denotes substituted and unsubstituted monovalent hydrocarbon groups, $R^1$ is an alkylene or alkyleneoxyalkylene group, c is an integer with a value of at least 4, d is an integer with a value from 1 to 3, m is a number greater than 0, and n is a number greater than 0; f, g, and h are each numbers greater than 0 and (g+h)≧f.

(C) 1 to 90 weight parts of an organosilane selected from the group consisting of organosilanes having the general formulae $R_eSiY_{4-e}$, and $SiY_4$, wherein R denotes substituted and unsubstituted monovalent hydrocarbon groups, Y is a hydrolyzable group, and e is an integer with a value of 1 or 2, and the partial hydrolysis condensate of the organosilane; and (D) a cure-accelerating catalyst in sufficient quantity to cure the composition.

* * * * *